(12) United States Patent
Kubisch et al.

(10) Patent No.: US 9,489,763 B2
(45) Date of Patent: Nov. 8, 2016

(54) TECHNIQUES FOR SETTING UP AND EXECUTING DRAW CALLS

(71) Applicant: NVIDIA Corporation, Santa Clara, CA (US)

(72) Inventors: Christoph Kubisch, Aachen (DE); Markus Tavenrath, Aachen (DE)

(73) Assignee: NVIDIA Corporation, Santa Clara, CA (US)

( * ) Notice: Subject to any disclaimer, the term of this patent is extended or adjusted under 35 U.S.C. 154(b) by 445 days.

(21) Appl. No.: 13/719,073

(22) Filed: Dec. 18, 2012

(65) Prior Publication Data

US 2014/0168242 A1 Jun. 19, 2014

(51) Int. Cl.
*G06T 15/00* (2011.01)
*G06T 1/60* (2006.01)
*G06F 9/38* (2006.01)

(52) U.S. Cl.
CPC ............ *G06T 15/005* (2013.01); *G06T 1/60* (2013.01); *G06F 9/3887* (2013.01)

(58) Field of Classification Search
None
See application file for complete search history.

(56) References Cited

U.S. PATENT DOCUMENTS

| 2011/0063296 | A1* | 3/2011 | Bolz et al. | 345/426 |
| 2011/0242125 | A1* | 10/2011 | Hall et al. | 345/582 |
| 2013/0328895 | A1* | 12/2013 | Sellers et al. | 345/522 |

OTHER PUBLICATIONS

Sellers; ARB_multi_draw_indirect; OpenGL; Jun. 14, 2012.*
Bolz et al.; ARB_draw_indirect; OpenGL; Dec. 7, 2009.*
Kvark; KRI features: bounding boxes and hierarchical Zculling; http://www.opentk.com/node/2583; Jul. 8, 2011.*
Shreiner; OpenGL Programming Guide 7th Ed.; Pearson Education; 2010.*
Bolz et al; NV_shader_buffer_load; OpenGL; Aug. 8, 2010.*
Bolz et al.; NV_vertex_buffer_unified_memory; OpenGL specification; Sep. 2009.*
Bolz; OpenGL Bindless Extensions; 2009.*
Kubisch et al.; NV_bindless_multi_draw_indirect; Jan. 2015.*

* cited by examiner

*Primary Examiner* — Carlos Perromat
(74) *Attorney, Agent, or Firm* — Artegis Law Group, LLP

(57) ABSTRACT

One embodiment sets forth a method for processing draw calls that includes setting up a plurality of shader input buffers in memory, receiving shader input data related to a graphics scene from a software application, storing the shader input data in the plurality of shader input buffers, computing a pointer to each shader input buffer included in the plurality of shader input buffers, and passing the pointers to the plurality of shader input buffers to the software application. By implementing the disclosed techniques, a shader program advantageously can access the shader input data associated with a graphics scene and stored in various shader input buffers without having to go through the central processing unit to have the shader input buffers binded to the shader program.

23 Claims, 6 Drawing Sheets

TECHNIQUES FOR SETTING UP AND EXECUTING DRAW CALLS

BACKGROUND OF THE INVENTION

Field of the Invention

The present invention generally relates to graphics processing and, more specifically, to techniques for setting up and executing draw calls.

Description of the Related Art

In conventional graphics processing systems, to render a graphics scene, a software application first sets up the scene. In so doing, the software application defines all the different shader input buffers for the different types of shader input data and sets up a command buffer for the draw calls that are to be executed to render the graphics scene. Once the shader input buffers are populated with the shader input data and the commend buffer is populated with the draw calls, a command engine within a graphics processing unit (GPU) begins pulling the draw calls from the command buffer for execution within the GPU.

When a graphics scene is rendered, only a fixed number of shader input buffers can be binded to a shader program executing within the GPU to render the graphics scene. Consequently, the total number of shader input buffers set up by the software application is oftentimes greater than the number of shader input buffers that can be binded to the shader program at any given time. Such outcomes are especially prevalent when rendering more complex graphics scenes because those graphics scenes oftentimes include numerous shader input buffers to store all of the different types of data associated with the graphics scene. For example, there may be multiple different types of geometry information associated with a complex graphics scene, where each different type of geometry information is stored in a different shader input buffer.

In situations where only a subset of the total number of shader input buffers are binded to the shader program, complications arise when a shader input buffer that is not binded to the shader program needs to be accessed. For example, a first geometry data buffer, but not a second geometry data buffer, could be binded to a shader program executing on a GPU. If the shader program wanted to access geometry data stored in the second geometry data buffer during execution, then the second geometry data buffer would have to be binded to the shader program before the shader program could access any of the geometry data in the second geometry data buffer. Binding a new shader input buffer to the shader program is expensive because the driver program has to work through the central processing unit (CPU) to bind the new shader input buffer to the shader program. As a general matter, the more times the CPU is called on to bind new buffers to a shader program during rendering, the more overall system performance is compromised.

Similarly, when a GPU generates draw calls during rendering, via a feedback shader, for example, changing shader input buffers in order to service the new draw calls requires synchronizing with the CPU because the CPU conventionally is responsible for changing shader input butters. Consequently, the CPU has to wait until the CPU has completed operations and read information back from the GPU regarding which shader input buffers to use for the new draw calls. Such synchronization operations can stall the graphic rendering pipeline, thereby negatively impacting overall performance.

As the foregoing illustrates, what is needed in the art is a more effective way to switch between shader input buffers when rendering a graphics scene.

SUMMARY OF THE INVENTION

One embodiment of the present invention sets forth a computer-implemented method for processing draw calls. The method includes setting up a plurality of shader input buffers in memory, receiving shader input data related to a graphics scene from a software application, storing the shader input data in the plurality of shader input buffers, computing a pointer to each shader input buffer included in the plurality of shader input buffers, and passing the pointers to the plurality of shader input buffers to the software application.

Other embodiments of the present invention include, without limitation, a computer-readable storage medium including instructions that, when executed by a processing unit, cause the processing unit to implement aspects of the techniques described herein as well as a system that includes different elements configured to implement aspects of the techniques described herein.

By implementing the disclosed techniques, shader input buffers no longer have to be binded to a shader program by the CPU/driver prior to executing within a graphics processing unit when rendering a graphics scene. Consequently, the shader program advantageously can access the shader input data associated with a graphics scene and stored in various shader input buffers without having to go through the central processing unit to have the shader input buffers binded to the shader program. As a result, overall processing efficiency of the graphics subsystem is increased, especially for complex graphics scenes involving many different types of shader input data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
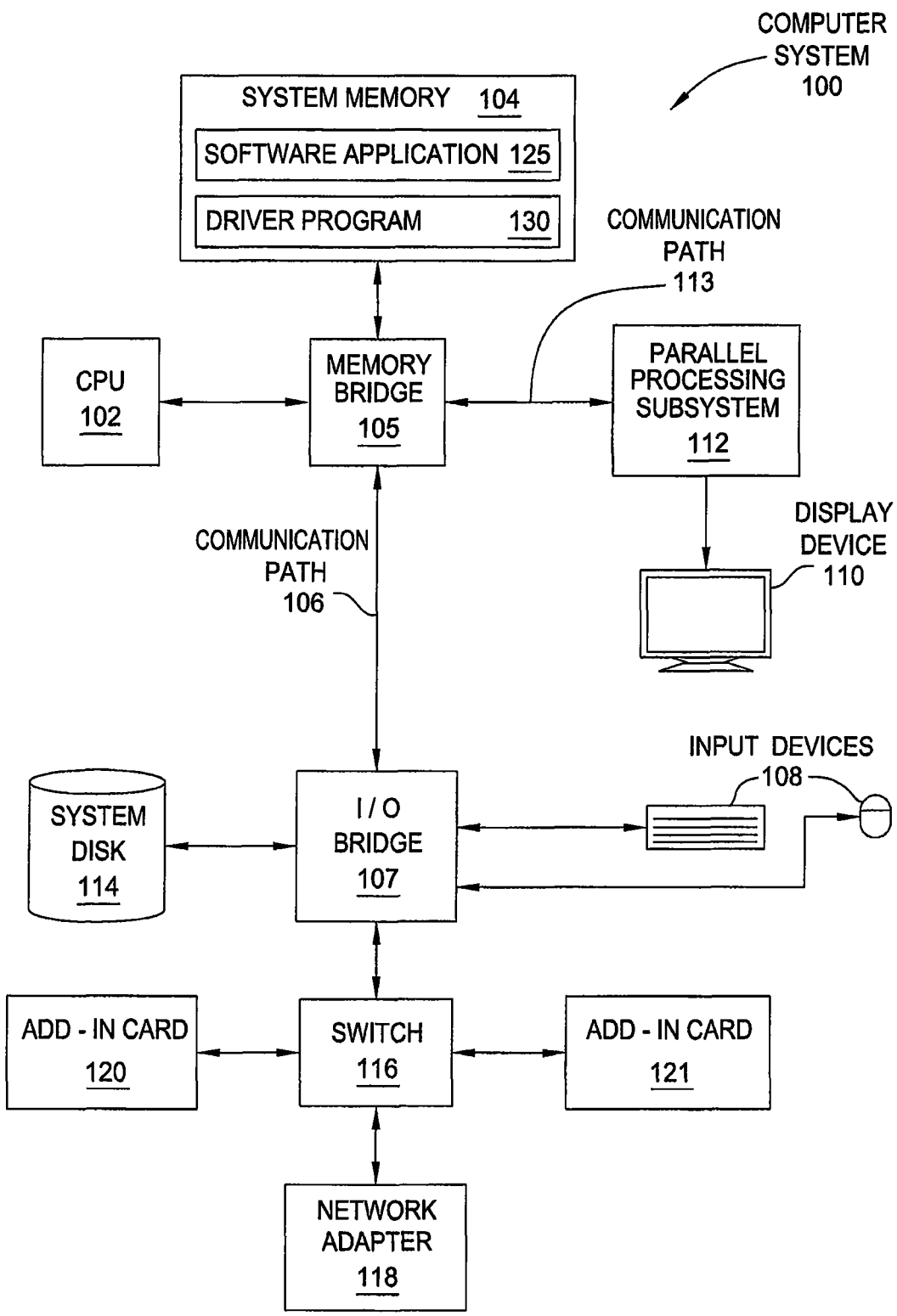
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communication paths 106 and 113, may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
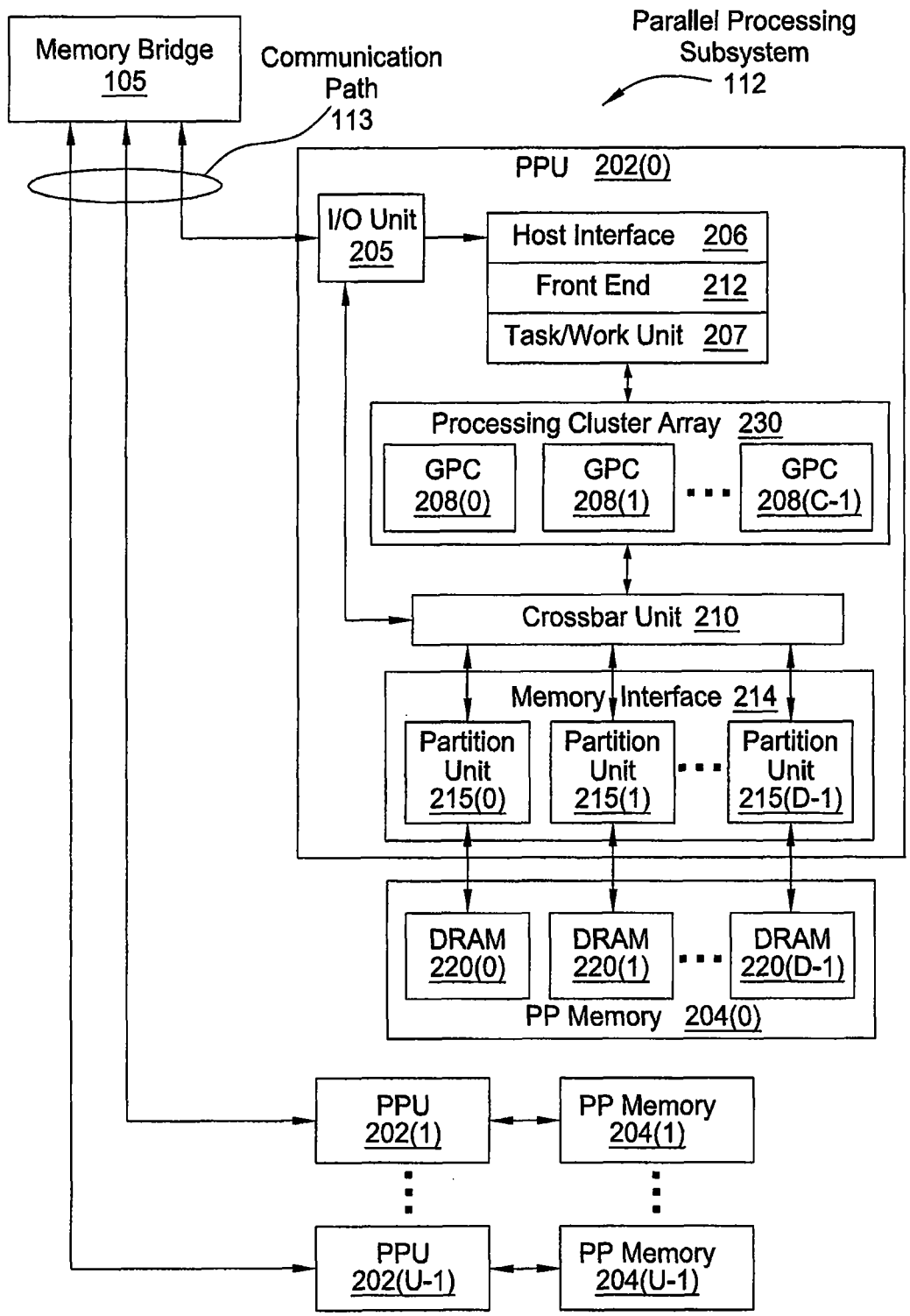
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. Those commands may originate within a software application 125 resident in system memory 104 and executing on CPU 102. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by software application 125 via the driver program 130 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C 1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D 1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Persons of ordinary skill in the art will understand that the architecture described in FIGS. 1 and 2 in no way limits the scope of the present invention and that the techniques taught herein may be implemented using any system that includes at least one properly configured processing unit, including, without limitation, one or more CPUs, one or more multi-core CPUs, one or more PPUs 202, one or more GPCs 208, one or more graphics or special purpose processing units, or the like, without departing the scope of the present invention.

Processing Draw Calls

Figure 3:
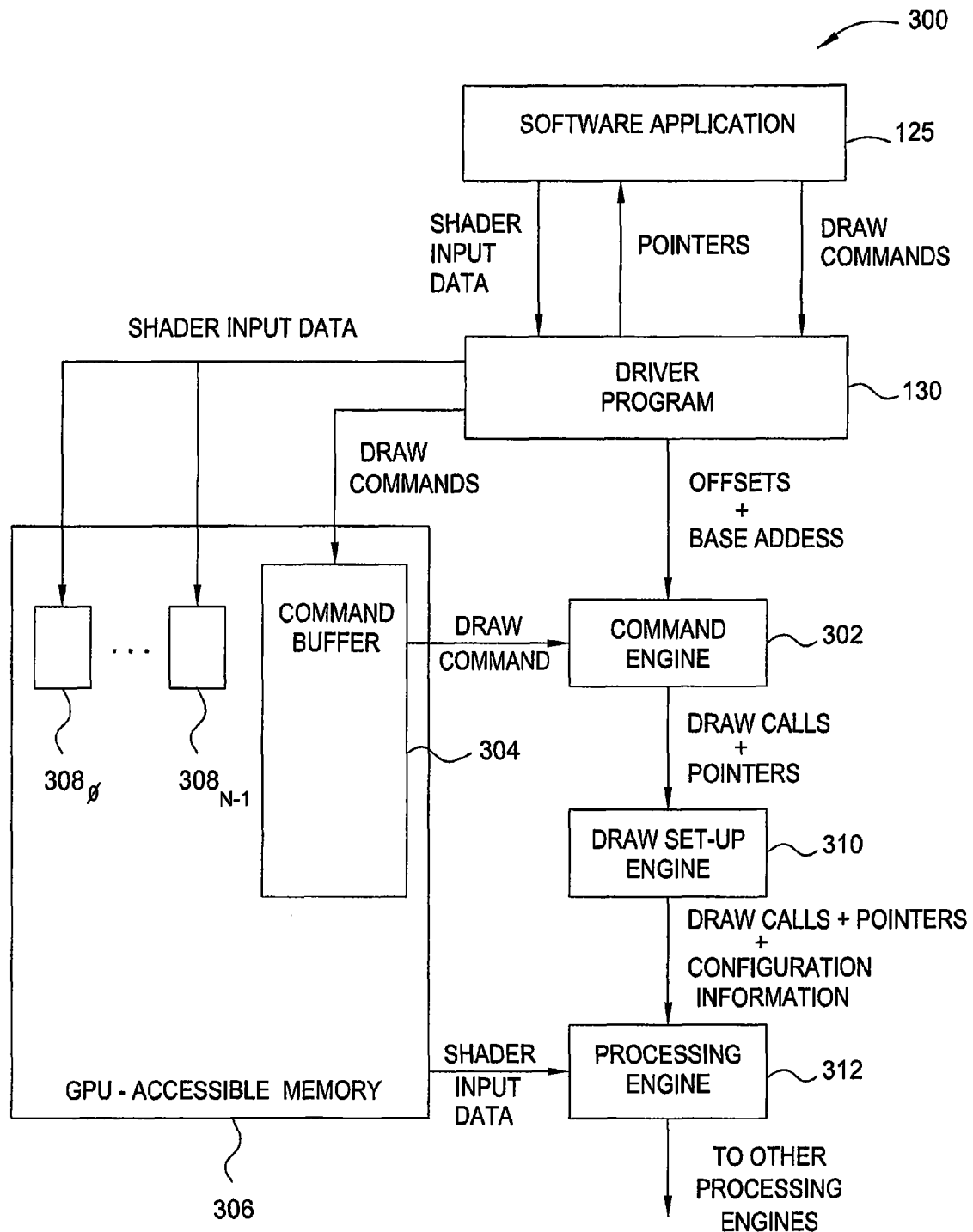
FIG. 3 is a conceptual block diagram of a subsystem configured to process draw calls, according to one embodiment of the present invention.

FIG. 3 is a conceptual block diagram of a subsystem 300 configured to process draw calls, according to one embodiment of the present invention. As shown, the subsystem 300 includes, without limitation, the software application 125 and the driver program 130 of FIG. 1, a command engine 302, a command buffer 304, a GPU-accessible memory 306 that includes a plurality of shader input buffers 308 and a command buffer 304, a draw set-up engine 310, and a processing engine 312. One skilled in the art will recognize that, in various embodiments, the command engine 302, the draw set-up engine 310, and the processing engine 312 may be implemented within any one of the PPUs 202 of FIG. 2 and that, in various embodiments, the GPU-accessible memory 306 may include at least a portion of one or more of the memories associated with any one of the PPUs 202, such as an on-chip memory or one of the PPU memories 204 of FIG. 2. In addition, in various embodiments, the command buffer 304 may reside in either the GPU memory 306 or the system memory 104.

To render a graphics scene, embodiments of the present invention implement draw commands, where each such draw command includes a set of one or more draw calls. A given draw command is typically associated with a particular graphics object within a graphics scene that is being rendered by the PPU 202 of FIG. 2 within which aspects of the subsystem 300 of FIG. 3 are implemented. As described in greater detail here, embodiments of the present invention enable draw calls to be executed within the GPU (i.e., PPU 202) when rendering a graphics scene without having to bind the shader programs to the different shader input buffers that store the shader input data associated with the graphics scene. Consequently, shader programs advantageously can access the shader input data associated with the graphics scene without having to go through the central processing unit to have the shader input buffers binded to the shader programs. As a result, overall processing efficiency of the graphics subsystem is increased, especially for complex graphics scenes involving many different types of shader input data.

As indicated in FIG. 3, before a graphics scene is rendered, the software application 125 first has to set up the graphics scene. As part of the set-up, the software application 125 specifies the different shader input buffers 308 needed to store the different types of shader input data associated with the graphics scene and defines the command buffer 304 for the draw commands that are to be executed to render the graphics scene. The software application 125 then causes the driver program 130 to set up the different shader input buffers 308 specified by the software application 125 as well as the command buffer 304. In one embodiment, the driver program 130 sets up the shader input buffers 308 as well as the command buffer 304 in GPU-accessible memory 306. The software application 125 also passes the shader input data associated with the graphics scene to the driver program 130 and causes the driver program 130 to store the shader input data associated with the graphics scene in the appropriate shader input buffers 308. As part of this process, the driver program 130 computes pointers to the different shader input buffers 308 and passes the pointers to back to the software application 125.

After receiving the pointers, the software application 125 passes the different draw commands needed to render the graphics scene to the driver program 130. The software application 125 also causes the driver program 130 to store the draw commands in the command buffer 304. In one embodiment, each draw command includes one or more draw calls, an indication of how many draw calls are included in the draw command, an offset into the command buffer 304 where the draw command is to be stored, and pointers to the particular shader input buffers 308 that store the shader input data needed to process the different draw calls included in the draw command. To store a given draw command in the command buffer 304, the shader program 130 accesses the offset included in the draw command and writes the draw command to the memory address determined from the offset included in the draw command and the base address of the command buffer 304.

To render the graphics scene, the driver program 130 passes the base address of the command buffer 304 as well as the offsets included in the different draw commands stored in the command buffer 304 to the command engine 302 within the GPU. In an alternative embodiment, where the draw commands are stored contiguously in, and accessed contiguously from, the command buffer 304, the driver program 130 passes the base address of the command buffer 304 and the offset associated with the first draw command to be accessed from the command buffer 304 to the command engine 302.

For a particular draw command stored in the command buffer 304, the command engine 302 pulls the draw command stored from the command buffer 304 using the base address of the command buffer 304 and an offset into the command buffer 304 received from the driver program 130. Again, in one embodiment, the offset is the offset corresponding to the particular draw command being pulled from the command buffer 304, where the offset was originally included in the particular draw command received from the software application 125. In an alternative embodiment, where the draw commands are stored contiguously in, and accessed contiguously from, the command buffer 304, the offset is the offset corresponding to the first draw command pulled from the command buffer 304 by the command engine 302. Upon pulling the draw command from the command buffer 304, the command engine 302 parses the draw command to access the draw calls indicated to be included in the draw command. As previously described herein, the draw command includes an indication of the number of draw calls included in the draw command. The command engine 302 also accesses the pointers to the shader input buffers 308 relevant to the accessed draw calls, where the pointers also are included in the draw command. After parsing the draw command, the command engine 302 passes the draw calls from the draw command as well as the pointers to the shader input buffers 308 relevant to those draw calls to the draw set-up engine 310.

For a particular draw call associated with the draw command pulled and parsed by the command engine 302, the draw set-up engine 310 processes the draw call to determine various configuration information needed to execute the draw call. For example, for the particular draw call, the draw set-up engine 310 may determine the type of primitive associated with the draw call, the number of distinct data elements associated with draw call, and the formatting associated with the different data elements. The draw set-up engine 310 then passes the draw call, the pointers to the shader input buffers 308 relevant to the draw call, and the configuration information associated with the draw call to the processing engine 312.

The processing engine 312 prepares to process the draw call received from the draw set-up engine 310 based on the configuration information received from the draw set-up engine 310. The processing engine 312 also obtains the shader input data relevant to the draw call using the pointers to the relevant shader input buffers 308 received from the draw set-up engine 310. The processing engine 312 then executes the draw call on the relevant shader input data and transmits the results to the next processing engine in the pipeline.

Figure 4A:
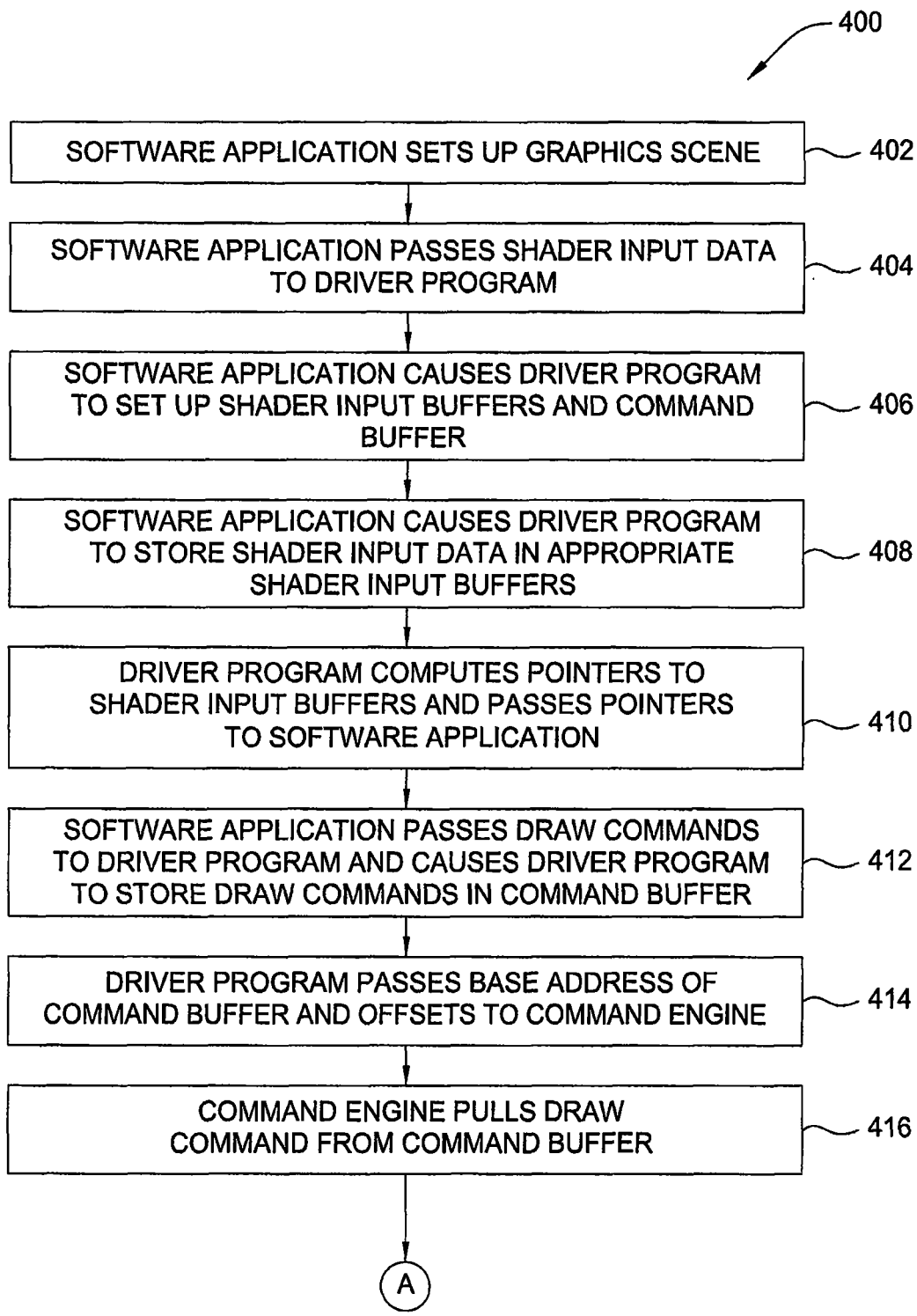
FIGS. 4A-4B set forth a flow diagram of method steps for processing draw calls, according to one embodiment of the present invention.
Figure 4B:
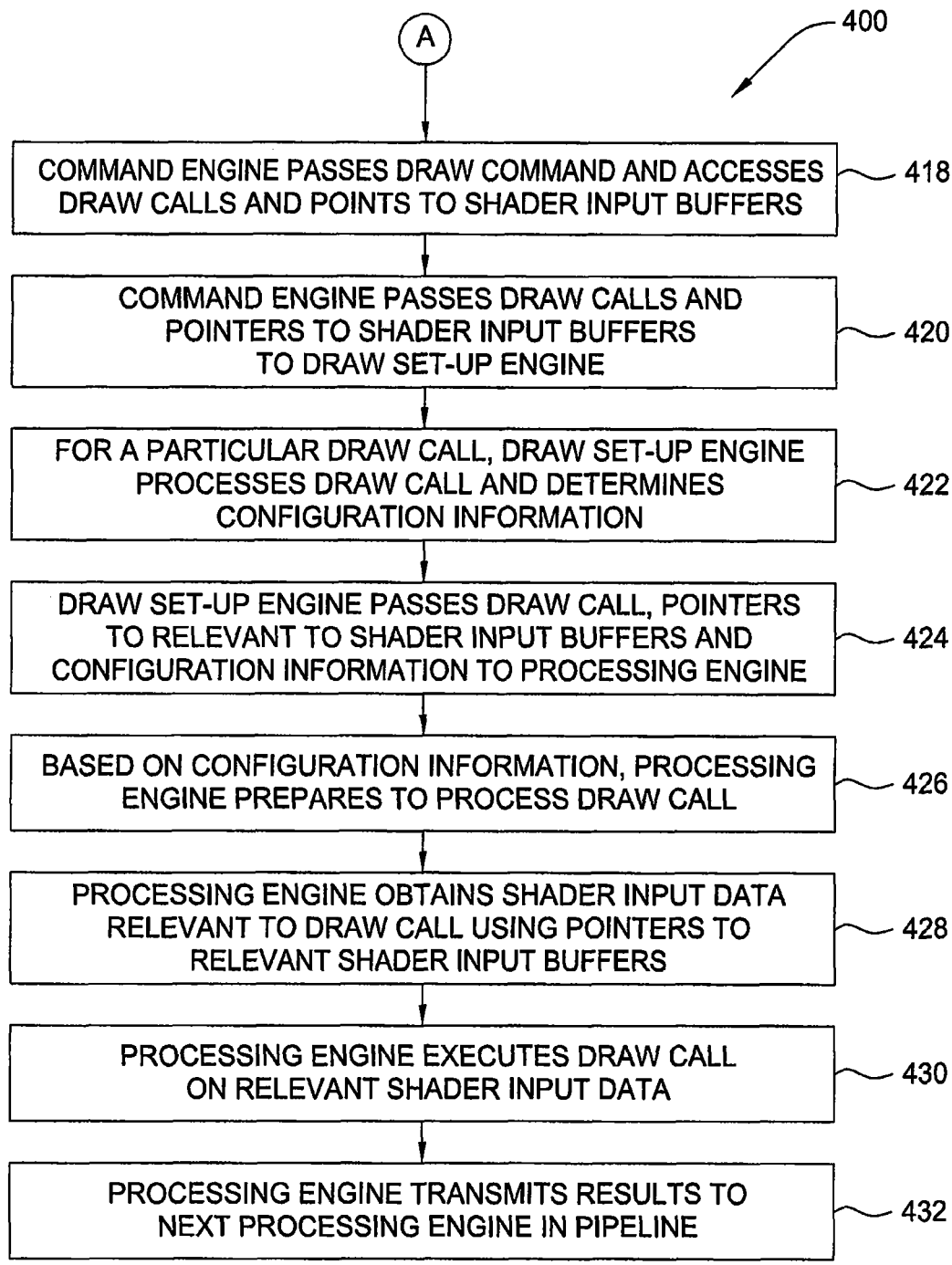

FIGS. 4A-4B set forth a flow diagram of method steps for processing draw calls, according to one embodiment of the present invention. Although the method steps are described with reference to the systems of FIGS. 1-3 and 5, persons skilled in the art will understand that any system configured to implement the method steps, in any order, falls within the scope of the present invention.

As shown, a method 400 begins in step 402, where the software application 125 sets up a graphics scene. As part of the set-up, the software application 125 specifies the different shader input buffers 308 needed to store the different types of shader input data associated with the graphics scene and defines a command buffer 304 for the draw commands that are to be executed to render the graphics scene. In step 404, the software application 125 causes the driver program 130 to set up the different shader input buffers 308 specified by the software application 125 as well as the command buffer 304. In one embodiment, the driver program 130 sets up the shader input buffers 308 as well as the command buffer 304 in GPU-accessible memory 306. In step 406, the software application 125 passes the shader input data associated with the graphics scene to the driver program 130. In step 408, the software application 125 causes the driver program 130 to store the shader input data associated with the graphics scene in the appropriate shader input buffers 308. In step 410, the driver program 130 computes pointers to the different shader input buffers 308 and then passes the pointers to back to the software application 125.

In step 412, the software application 125 passes draw commands needed to render the graphics scene to the driver program 130. The software application 125 also causes the driver program 130 to store the draw commands in the command buffer 304. As previously described herein, each draw command includes one or more draw calls, an indication of how many draw calls are included in the draw command, an offset into the command buffer 304 where the draw command is to be stored, and pointers to the particular shader input buffers 308 that store the shader input data needed to process the different draw calls included in the draw command. To store a given draw command in the command buffer 304, the shader program 130 accesses the offset included in the draw command and writes the draw command to the memory address determined from the offset included in the draw command and the base address of the command buffer 304.

When the graphics scene is being rendered, the driver program 130, in step 414, passes the base address of the command buffer 304 as well as the offsets included in the different draw commands stored in the command buffer 304 to the command engine 302 within the GPU. In an alternative embodiment, where the draw commands are stored contiguously in, and accessed contiguously from, the command buffer 304, the driver program 130 passes the base address of the command buffer 304 and the offset associated with the first draw command to be accessed from the command buffer 304 to the command engine 302.

For a particular draw command stored in the command buffer 304, in step 416, the command engine 302 pulls the draw command stored from the command buffer 304 using the base address and an offset into the command buffer 304 received from the driver program 130. In step 418, the command engine 302 parses the draw command to access the draw calls indicated to be included in the draw command. Again, the draw command includes an indication of the number of draw calls included in the draw command. The command engine 302 also accesses the pointers to the shader input buffers 308 relevant to those draw calls that also are included in the draw command. In step 420, the command engine 302 passes the draw calls from the draw command as well as the pointers to the shader input buffers 308 relevant to those draw calls to the draw set-up engine 310.

For a particular draw call associated with the draw command pulled and parsed by the command engine 302, in step 422, the draw set-up engine 310 processes the draw call to determine various configuration information needed to execute the draw call. For example, for the particular draw call, the draw set-up engine 310 may determine the type of primitive associated with the draw call, the number of distinct data elements associated with draw call, and the formatting associated with the different data elements. In step 424, the draw set-up engine 310 passes the draw call, the pointers to the shader input buffers 308 relevant to the draw call, and the configuration information associated with the draw call to the processing engine 312. In step 426, the processing engine 312 prepares to process the draw call based on the configuration information received from the draw set-up engine 310. In step 428, the processing engine 312 obtains the shader input data relevant to the draw call using the pointers to the shader input buffers 308 relevant to the draw call received from the draw set-up engine 310. In step 430, the processing engine 312 executes the draw call on the relevant shader input data. In step 432, the processing engine 312 transmits the results to the next processing engine in the pipeline.

Figure 5:
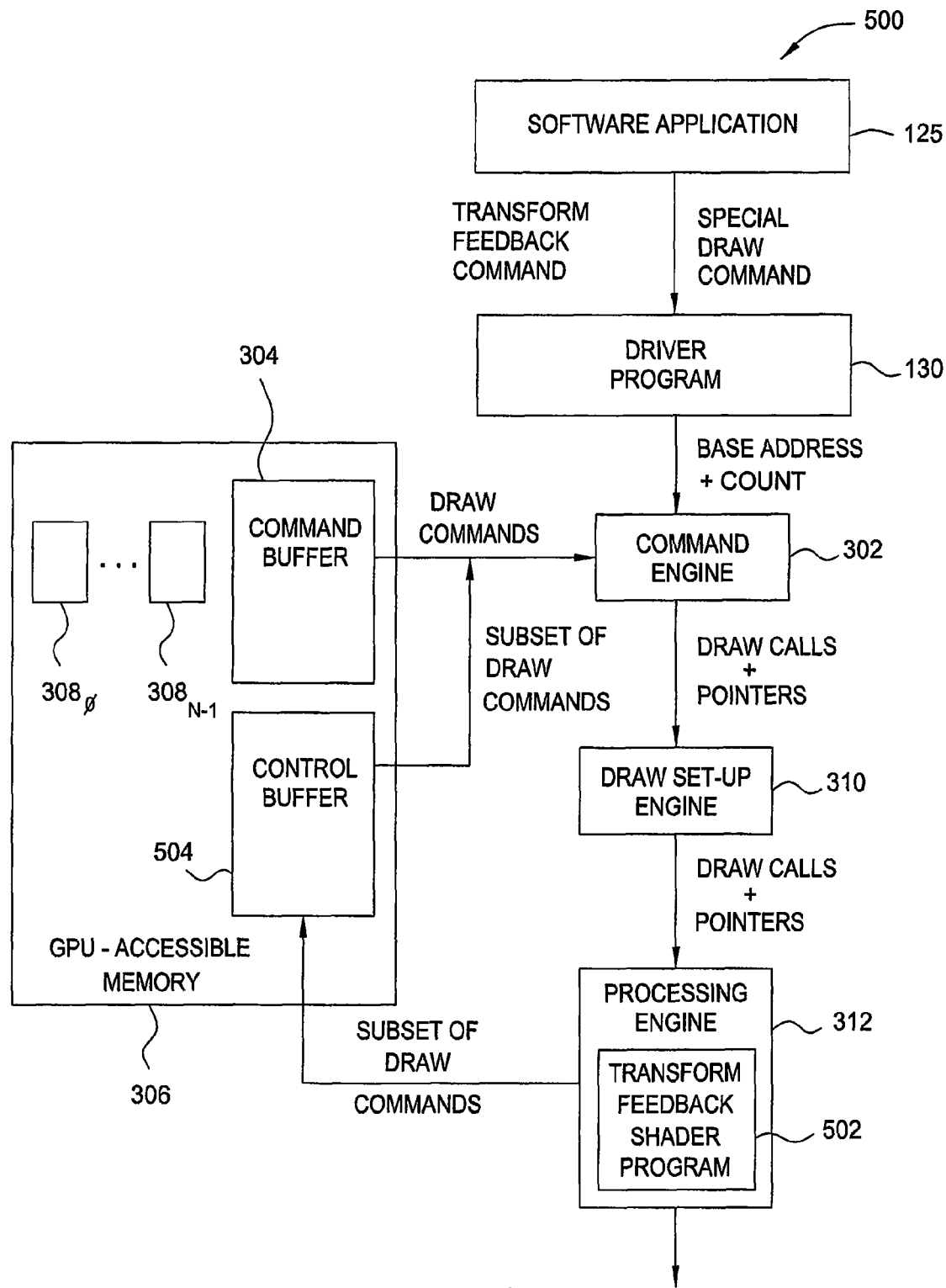
FIG. 5 is conceptual block diagram of a subsystem configured to process draw calls, according to another embodiment of the present invention.

FIG. 5 is conceptual block diagram of a subsystem 500 configured to process draw calls, according to another embodiment of the present invention. As shown, the subsystem 500 is substantially similar to the subsystem 300 of FIG. 3; however, an optimization is implemented within the subsystem 500 to determine which draw calls transmitted through the subsystem 500 in a first pass should be processed in the subsystem 500 in a second pass. More specifically, in the subsystem 500, the processing engine 312 is configured to execute a transform feedback shader program 502 to analyze the draw calls related to a particular graphics scene and determine which of those draw calls should be processed within the subsystem 500. A control buffer 504 also is included in GPU-accessible memory 306 that is accessible by the command engine 302 and is configured to receive and store the output generated by the transform feedback shader program 502.

In operation, as previously described herein, draw commands are transmitted by the software application 125 to the driver program 130 for processing. Again, the draw commands and the draw calls included in those draw commands are associated with one or more graphics objects within a graphics scene being rendered by a GPU (i.e., one of the PPUs of FIG. 2) that is configured to implement one or more aspects of subsystem 500. The draw commands and related draw calls are processed within the subsystem 500 by the driver program 130, the command engine 302, and the draw set-up engine 310 in a manner that is substantially similar to the manner set forth above in conjunction with FIGS. 3 and 4A-4B.

In this embodiment, however, the software application 125 also transmits a special transform feedback command to the driver program 130. When the driver program 130 executes the transform feedback command, the driver program 130 configures the processing engine 312 to execute the transform feedback shader program 502. When executed, the transform feedback shader program 502 analyzes the different draw calls passed to the processing engine 312 by the draw set-up engine 310 and determines which of those draw calls should be processed by the subsystem 500 in a subsequent pass. Thus, instead of executing the draw calls received from the draw set-up engine 310, as is done in subsystem 300 of FIG. 3, the processing engine 312 executes the transform feedback shader program 502 to determine which of the draw calls received from the draw set-up engine 310 should be processed by the subsystem 500 in a subsequent pass. For example, in one embodiment, the transform feedback shader program 502 could be configured to perform a visibility test to determine whether the primitive associated with a particular draw call is visible. The transform feedback shader program 502 would then filter out all draw calls associated with non-visible primitives and let pass only draw calls associated with visible primitives, and those draw calls would be processed in a subsequent pass through the subsystem 500.

In one embodiment, the transform feedback shader program 502 is further configured to convert the draw calls that the transform feedback shader program 502 determines should be processed within the subsystem 500 into draw commands. As shown in FIG. 5, the transform feedback shader program 502 outputs those draw commands and stores the draw command in the control buffer 504. The GPU maintains a counter (not shown) that is configured to count the number of draw commands output by the transform feedback shader program 502 and stored in the control buffer 504.

In addition, the software application 125 also transmits to the driver program 130 a special draw command that causes the draw commands stored in the control buffer 504 to be executed within the subsystem 500. More particularly, in one embodiment, the special draw command includes a transform feedback object that includes a reference to the counter maintained by the GPU. In one embodiment, the special draw command may also include the base address of the control buffer 504. When the driver program 130 receives the special draw command from the software application 125, the driver program 130 stores the special draw command in the command buffer 304 based on an offset included in the special draw command. In operation, the command engine 302 pulls the special draw command from the command buffer 304, accesses the reference to the counter from the transform feedback object included in the special draw command, and determines the count recorded by the counter. The command engine 302 then accesses the control buffer 504 via the base address included in the special draw command and pulls a number of draw commands from the control buffer 504 equal to the count. The command engine 302, the draw set-up engine 310, and the processing engine 312 then process the pulled draw commands and the draw calls associated with those draw commands as previously described herein.

Persons skilled in the art will understand that the use of a transform feedback shader program and counter generate and track draw commands for the GPU to execute is one example of how a GPU may write to GPU-accessible memory. In other embodiments, the contents of the command buffers in GPU-accessible memory, such as command buffer 304 and content buffer 504, may be populated in other ways. For example, any shader capable of writing to GPU-accessible memory or capable of performing arbitrary memory writes may be implemented. As such, persons skilled in the art will appreciate that the scope of the present invention is in no way limited by the specific examples of FIG. 5 and all mechanisms that allow a GPU to write to GPU-accessible memory fall within the scope of the present invention.

By implementing the disclosed techniques, shader input buffers no longer have to be binded to a shader program by the CPU/driver prior to execution within a graphics processing unit when rendering a graphics scene. Consequently, the shader program advantageously can access the shader input data associated with a graphics scene and stored in various shader input buffers without having to go through the central processing unit to have the shader input buffers binded to the shader program. As a result, overall processing efficiency of the graphics subsystem is increased, especially for complex graphics scenes involving many different types of shader input data.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of the present invention is determined by the claims that follow.

What is claimed is:

1. A computer-implemented method for processing draw calls, the method comprising:
setting up a plurality of shader input buffers in memory;
receiving shader input data related to a graphics scene from a software application;
storing the shader input data in the plurality of shader input buffers;

computing a pointer to each shader input buffer included in the plurality of shader input buffers;

passing the pointers to the plurality of shader input buffers to the software application; and receiving from the software application one or more draw commands, wherein each draw command includes a plurality of pointers, wherein each pointer included in the plurality of pointers references a different shader input buffer included in the plurality of shader input buffers.

2. The method of claim 1, further comprising setting up a command buffer in memory.

3. The method of claim 2, wherein the plurality of shader input buffers and the command buffer are set up in memory accessible by a graphics processing unit.

4. The method of claim 1, wherein each draw command further includes an indication of the number of draw calls included in the draw command.

5. The method of claim 1, wherein each draw command further includes an offset into a command buffer, and, for each draw command, further comprising storing the draw command in the command buffer at an address determined from the offset included in the draw command and a base address associated with the command buffer.

6. The method of claim 5, further comprising passing to a command engine an offset associated with one of the draw commands included in the one or more draw commands and the base address associated with the command buffer.

7. The method of claim 6, further comprising pulling a first draw command from the command buffer based on the offset associated with one of the draw commands and the base address associated with the command buffer.

8. The method of claim 7, further comprising parsing the first draw command to access a plurality of draw calls included in the first draw command and the at least one pointer included in the first draw command.

9. The method of claim 8, further comprising, based on at least one pointer included in the first draw command, accessing shader input data stored in at least one shader input buffer included in the plurality of shader input buffers.

10. The method of claim 9, further comprising executing one of the draw calls included in the first draw command on the shader input data stored in the at least one shader input buffer.

11. The method of claim 8, further comprising executing a transform feedback shader program to analyze the plurality of draw calls included in the first draw command and determine that a first draw call included in the plurality of draw calls should be processed.

12. The method of claim 11, further comprising converting the first draw call into a draw command and storing the draw command in a control buffer for processing by the command engine.

13. The method of claim 1, further comprising accessing, via a shader program, the shader input data from the plurality of shader input buffers without binding the plurality of shader input buffers to the shader program.

14. The method of claim 1, wherein each draw command further includes a plurality of draw calls.

15. A non-transitory computer-readable storage medium including instructions that, when executed by a processor, cause the processor to process draw calls by performing the steps of:

setting up a plurality of shader input buffers in memory;

receiving shader input data related to a graphics scene from a software application;

storing the shader input data in the plurality of shader input buffers;

computing a pointer to each shader input buffer included in the plurality of shader input buffers;

passing the pointers to the plurality of shader input buffers to the software application; and receiving from the software application one or more draw commands, wherein each draw command includes a plurality of pointers, wherein each pointer included in the plurality of pointers references a different shader input buffer included in the plurality of shader input buffers.

16. The non-transitory computer-readable storage medium of claim 15, further comprising setting up a command buffer in memory.

17. The non-transitory computer-readable storage medium of claim 15, wherein each draw command further includes an offset into a command buffer, and, for each draw command, further comprising storing the draw command in the command buffer at an address determined from the offset included in the draw command and a base address associated with the command buffer.

18. The non-transitory computer-readable storage medium of claim 17, further comprising passing to a command engine an offset associated with one of the draw commands included in the one or more draw commands and the base address associated with the command buffer.

19. The non-transitory computer-readable storage medium of claim 15, wherein each draw command further includes a plurality of draw calls.

20. A system configured to process draw calls, the system comprising:

a memory that includes a driver program; and a processor coupled to the memory that, when executing the driver program, is configured to:

set up a plurality of shader input buffers in memory, receive shader input data related to a graphics scene from a software application, store the shader input data in the plurality of shader input buffers, compute a pointer to each shader input buffer included in the plurality of shader input buffers, pass the pointers to the plurality of shader input buffers to the software application, and receive from the software application one or more draw commands, wherein each draw command includes a plurality of pointers, wherein each pointer included in the plurality of pointers references a different shader input buffer included in the plurality of shader input buffer, and a plurality of draw calls.

21. The system of claim 20, further comprising a command engine configured to pull a first draw command from a command buffer based on an offset associated with one of the draw commands received by the driver program and a base address associated with the command buffer, and to parse the first draw command to access the plurality of draw calls included in the first draw command and the plurality of pointers included in the first draw command.

22. The system of claim 20, wherein the processor, when executing the driver program, is further configured to set up a command buffer in memory.

23. The system of claim 20, wherein the processor, when executing the driver program, is further configured to store, for each draw command included in the one or more draw commands, the draw command in a command buffer at an address determined from an offset included in the draw command and a base address associated with the command buffer.

\* \* \* \* \*